July 8, 1969 E. L. GALLE 3,454,263
PROCESS AND APPARATUS FOR AGGLOMERATING PARTICULATE
MATERIALS AND HIGH SPEED MIXER THEREFOR
Filed Jan. 27, 1967

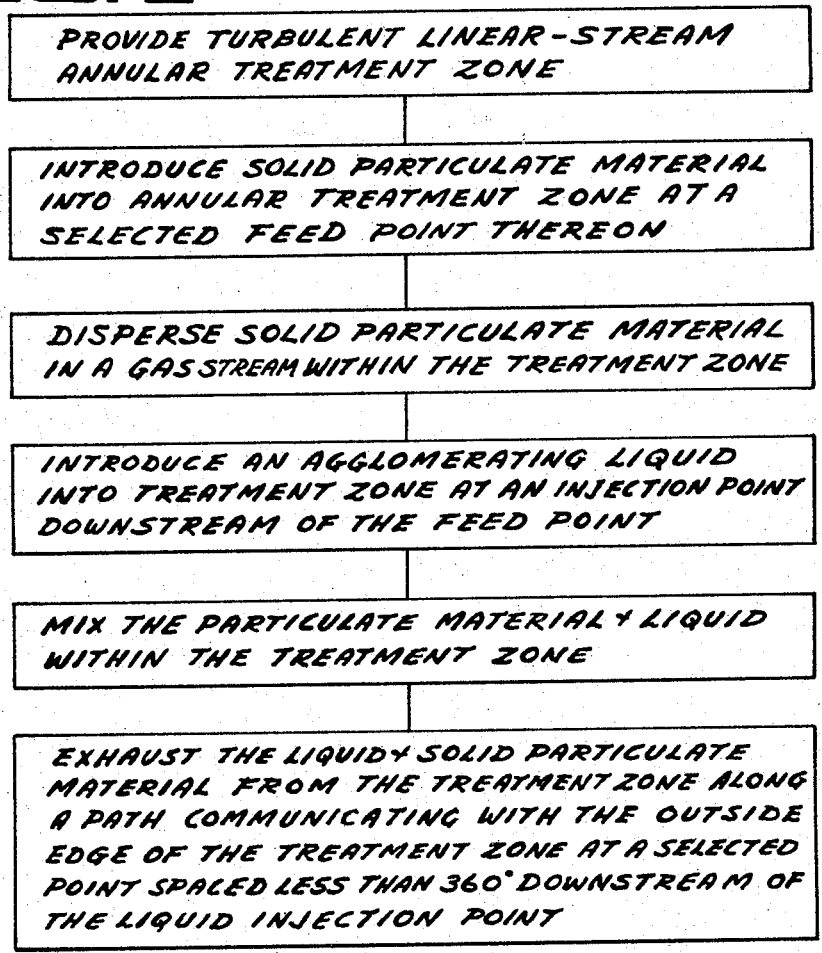

FIG. 1

- PROVIDE TURBULENT LINEAR-STREAM ANNULAR TREATMENT ZONE
- INTRODUCE SOLID PARTICULATE MATERIAL INTO ANNULAR TREATMENT ZONE AT A SELECTED FEED POINT THEREON
- DISPERSE SOLID PARTICULATE MATERIAL IN A GAS STREAM WITHIN THE TREATMENT ZONE
- INTRODUCE AN AGGLOMERATING LIQUID INTO TREATMENT ZONE AT AN INJECTION POINT DOWNSTREAM OF THE FEED POINT
- MIX THE PARTICULATE MATERIAL + LIQUID WITHIN THE TREATMENT ZONE
- EXHAUST THE LIQUID + SOLID PARTICULATE MATERIAL FROM THE TREATMENT ZONE ALONG A PATH COMMUNICATING WITH THE OUTSIDE EDGE OF THE TREATMENT ZONE AT A SELECTED POINT SPACED LESS THAN 360° DOWNSTREAM OF THE LIQUID INJECTION POINT

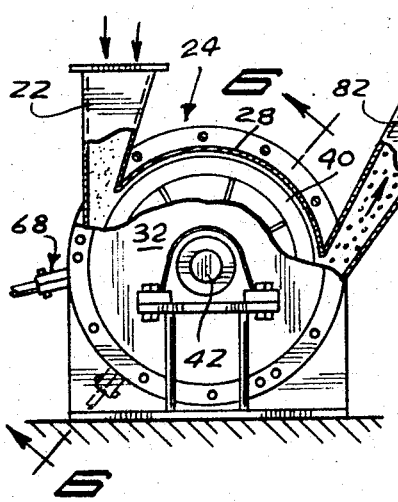

FIG. 5

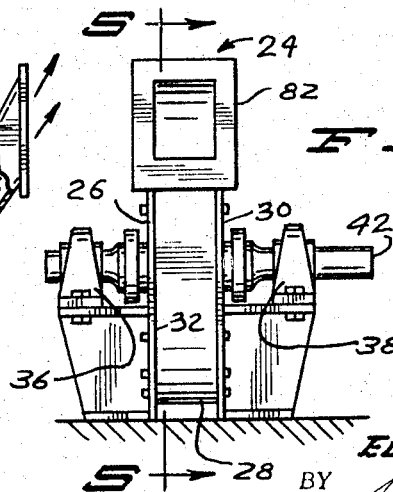

FIG. 4

INVENTOR.
EDWARD L. GALLE
BY James V. Harmon
ATTORNEY

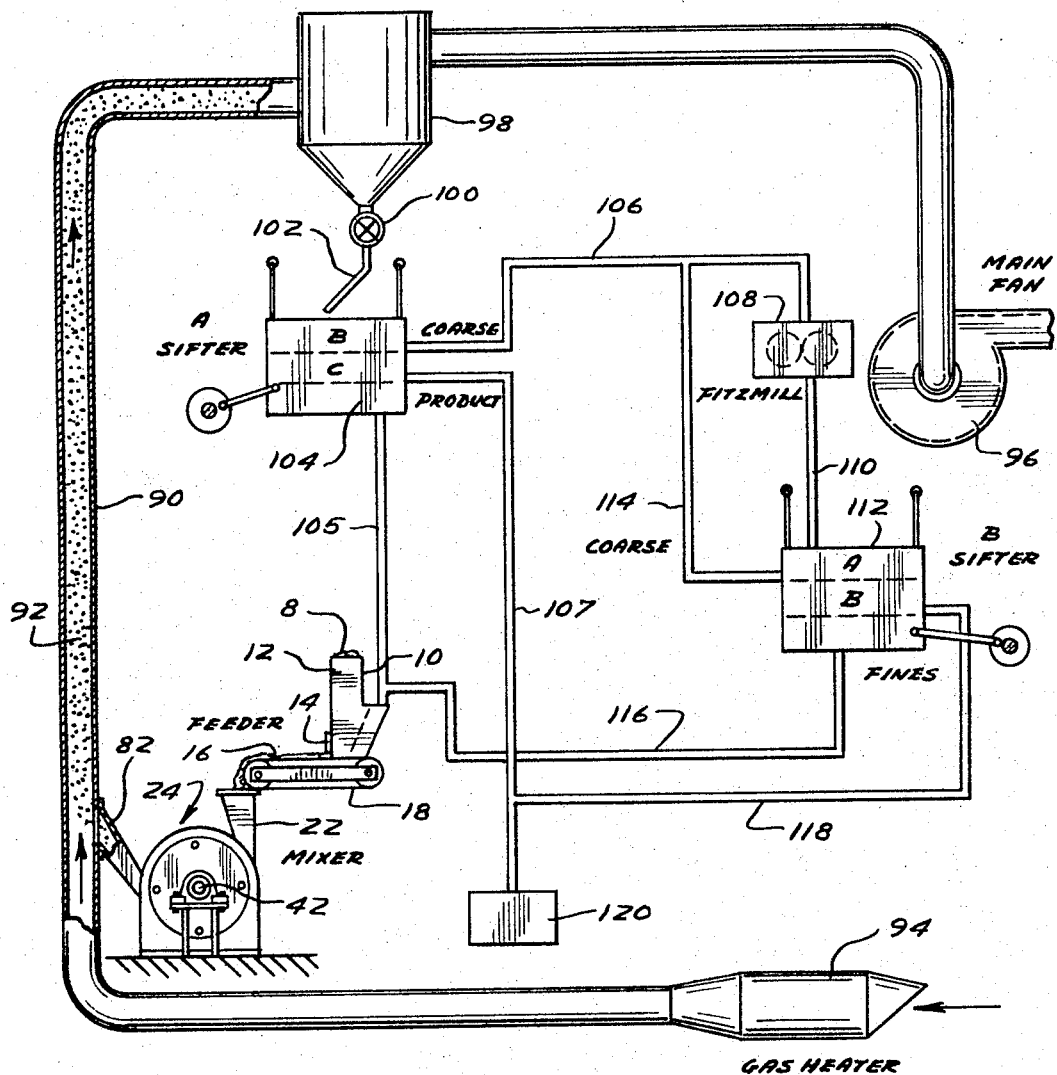
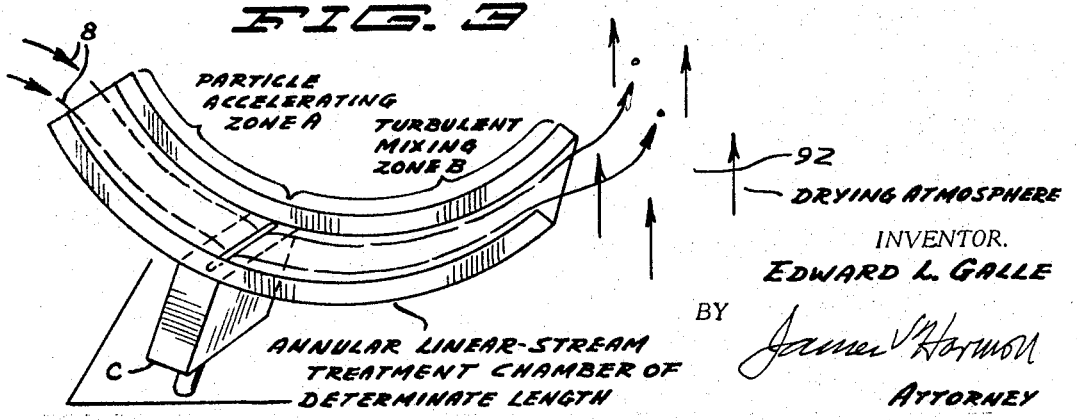

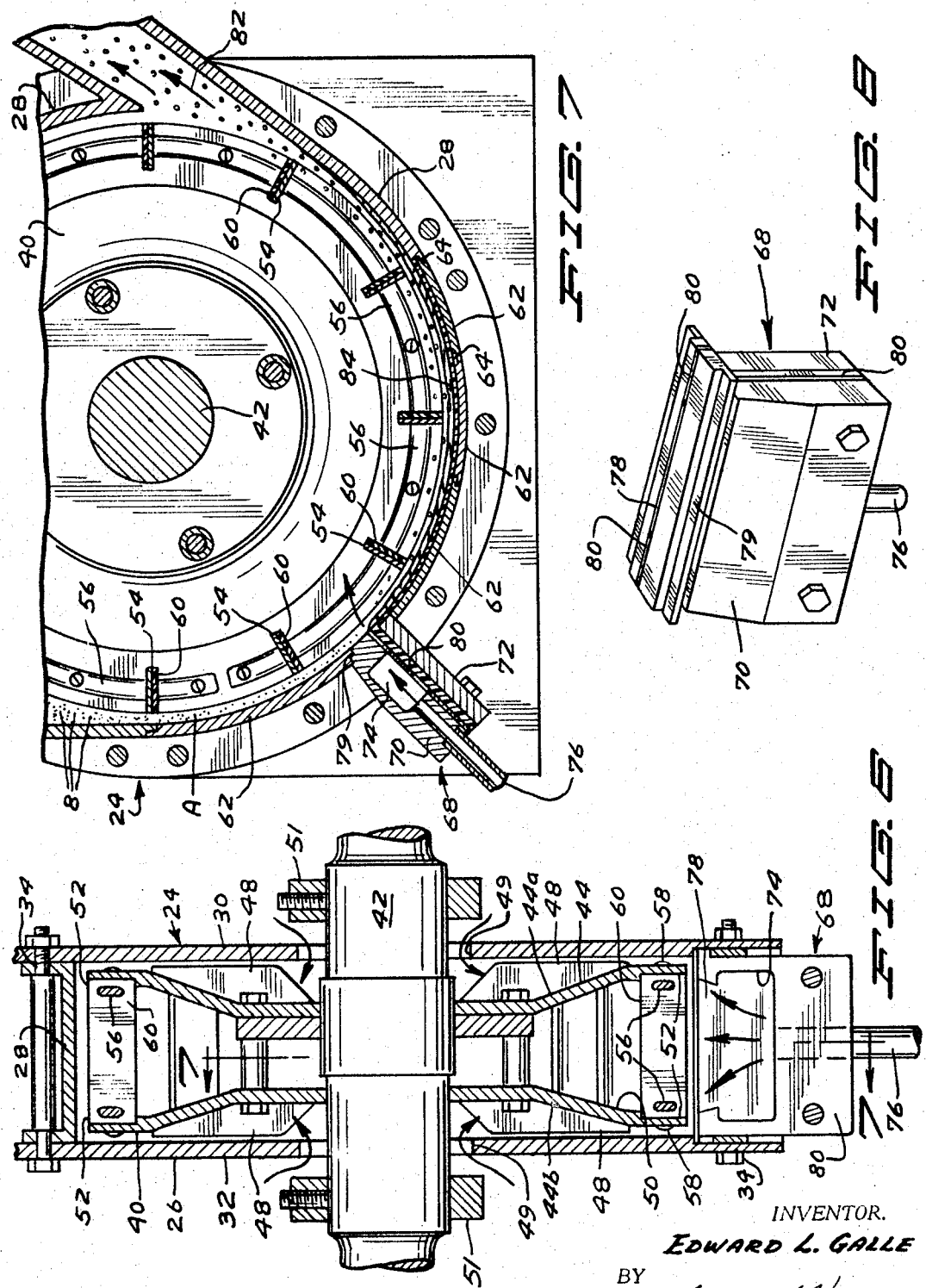

United States Patent Office 3,454,263
Patented July 8, 1969

3,454,263
PROCESS AND APPARATUS FOR AGGLOMERATING PARTICULATE MATERIALS AND HIGH SPEED MIXER THEREFOR
Edward L. Galle, St. Paul, Minn., assignor to The Pillsbury Company, Minneapolis, Minn., a corporation of Delaware
Filed Jan. 27, 1967, Ser. No. 612,116
Int. Cl. B01f 15/00, 7/02, 15/02
U.S. Cl. 259—9                                25 Claims

ABSTRACT OF THE DISCLOSURE

Particulate material that tends to soften or form a sticky mass easily upon exposure to a liquid is agglomerated (clustered) by passing it through an arcuate treatment zone of a defined and preferably adjustable length in which it is exposed to an agglomerating agent (usually water) and then expelled directly into a drying zone such as a rising stream of hot air. Treatment zone is defined by a narrow space between a rotating bladed rotor and a cylindrical casing wall. Treated particles are exhausted from the casing before traveling through a complete 360° arc so that treatment can be limited, e.g. to less than 20 milliseconds.

---

The present invention relates to a method and apparatus for forming agglomerates from particulate materials. The invention is particularly useful in forming readily soluble or dispersible agglomerates from powdered solids which hydrate rapidly.

The term "agglomeration" in the present application means the process of forming clusters of relatively small individual particles by providing an adhesive film on the surface of the particles, next bringing the particles together in random contact while freely suspended in a gaseous supporting medium and thereafter removing excess moisture from the interstices between the particles thus bonded together. The particles are maintained in random motion and in a fluid condition as they are brought into contact with one another. The agglomerates produced in this manner are composed of a relatively loosely compacted lacy network with a fairly high proportion of open space between the bonded particles. Agglomerates of this type are easily wetted when placed in a liquid. The agglomerates formed in accordance with the present invention can be easily distinguished from balls, pellets, tablets or sintered masses formed by tumbling, rolling or compressing by the marked differences in bond strength, density and open area.

Many processes and devices have been previously proposed for providing porous agglomerates including agglomerators employing a horizontally disposed elongated cylindrical mixing chamber within which is mounted a rotor having a relatively long shaft and a plurality of radially extending blades distributed along its length, an opening for introducing untreated particles at one end of the cylinder, a provision for feeding a liquid to the cylinder at about its center and an exhaust duct at the opposite end for removing the agglomerated particulate material from the cylinder. Particles of material entering a mixer of this type are propelled through the mixer along a multiplicity of more or less helical paths. The paths are of indeterminate length since there is no definite means of controlling the number of revolutions any selected particle will make within the housing. In typical applications, the retention time in the housing is approximately 0.10 to 0.50 second. Accordingly, some particles are treated for longer periods of time than others as they travel from one end thereof to the other. This type of agglomerator is disclosed, for example, in Patent Nos. 3,248,228 and 3,251,695. While the general type of apparatus described therein is suitable for a variety of applications, it has been found in the case of certain materials, especially those which absorb water easily, that brief exposure to moisture forms gummy or sticky masses which are not only difficult to dry but tend to foul the equipment and after being dried become relatively dense solid bodies which have very poor rehydration characteristics so that when added to water moisture is absorbed very slowly.

In the machines of the type described in the above-mentioned patents, attempts have been made, by varying processing variables as far as conditions permitted, to agglomerate materials which absorb water easily. In some instances these attempts were unsuccessful. Of particular difficulty was the agglomeration of materials such as pregelatinized starch and certain other polysaccharides including plant gums. Pregelatinized starch is produced by heating raw starch in water sufficiently to rupture the starch cells followed by drying. This product will absorb moisture relatively easily and when fed into prior equipment tended to form sticky or gummy masses which became deposited upon the exposed surfaces and tended to clog ducts, openings and other parts. The formation of gummy masses or accumulations of sticky material not only interfered with the production of suitable agglomerates but also substantially reduced the quantity of material that could be processed in a given period of time. Moreover, the gummy masses often became charred, broke off and were carried into the end product as black specks thereby adversely affecting the quality of the finished material. In addition, formation of deposits required the frequent removal, cleaning and replacement of parts. This is particularly objectionable in the case of tough or difficult-to-remove deposits and in the case of toxic chemicals which can produce a safety hazard for those operating and maintaining the equipment.

A still further shortcoming of the prior devices is their inability, in the case of certain materials, to effectively and reliably maintain the finished product characteristics within the prescribed limits. It has been found, for example, that in some cases such a broad range of particle sizes resulted that only a small fraction was usable. The rest had to be returned for reprocessing.

In view of the deficiencies encountered in the prior art, it is one object of the present invention to provide an improved process, apparatus and mixer suited for agglomerating materials which absorb water easily.

Another object of the present invention is the provision of an improved agglomerating process and apparatus wherein the time interval during which the particles of material to be agglomerated are subjected to turbulent mixing can be accurately and reliably controlled.

A further object of the present invention is the provision of an improved agglomerating process and apparatus wherein the particles to be agglomerated are conducted at high speed through a relatively turbulent annular linear-stream mixing zone of determinate length and transferred immediately from the turbuelnt mixing zone to a drying zone in which the particles are exposed to a heated drying gas.

Still another object of the invention is the provision of an improved high speed mixer apparatus for mixing solid particulate material and liquids including an annular stream mixing zone and a provision for accurately and reliably controlling the time period in which the particulate material is maintained in the turbulent mixing zone.

These and other more detailed and specific objects will become apparent from the following description of the invention and drawings wherein, FIGURE 1 is a chart illustrating the steps performed in accordance with the present invention.

FIGURE 2 is a flow diagram illustrating the flow of materials in accordance with a preferred form of the invention.

FIGURE 3 is a diagrammatic representation of the treatment zone and the path taken by particles as they travel through the treatment zone to the drying zone.

FIGURE 4 is an end elevational view of the mixer in accordance with the invention.

FIGURE 5 is a side elevational view of the mixer in accordance with the invention.

FIGURE 6 is a longitudinal sectional view taken on line 6—6 of FIGURE 5.

FIGURE 7 is a partial transverse sectional view taken on line 7—7 of FIGURE 6.

FIGURE 8 is a perspective view of the nozzle in accordance with the invention.

Briefly, as seen in FIGURES 1 and 3, a turbulent annular and linear stream treatment zone is provided including accelerating and mixing zones. The solid particulate material that is to be agglomerated is introduced into the treatment zone at a selected feed point. In accordance with one preferred form of the invention, the treatment zone is defined by a segment of the circumference of a relatively narrow cylindrical housing and a relatively narrow rotor mounted within the housing. Material is introduced to the treatment zone continuously at a constant feed rate. Within the treatment zone the solid particulate material is dispersed in a gas stream. The gas is preferably introduced to the treatment zone in large part through a separated inlet port from the solid particles. The rotor produces a turbulent but linear streaming of gas through an annular mixing zone at the periphery of the housing. At a selected point within the annular treatment zone downstream of the feed point an agglomerating liquid such as water is introduced and mixed with the solid particles. Solid and liquid materials are exhausted from the mixing zone through an outlet located at a selected distance from the point where the liquid is introduced. It has been discovered in accordance with the invention that by controlling the peripheral speed of the rotor, and the length of the arc between the liquid feed point and the exhaust point, the time period during which the particles are exposed to turbulent mixing with the agglomerating liquid can be accurately and reliably controlled and it is by controlling this factor that it has been found possible to produce high quality porous agglomerates in some materials which have the great affinity for water including pregelatinized starch. Moreover, the agglomerates can be produced without a build-up of gummy or charred deposits on the walls of the housing. It should be noticed particularly with reference to FIGURE 3 that the path taken by the particles through the turbulent mixing zone instead of being helical as was common practice in the past is relatively linear from the point at which they are first exposed to liquid to the point at which they are expelled into the drying atmosphere and it is in large part through this provision that a number of the deficiencies of the prior art are avoided.

By the term "linear" or "linear-stream" as employed herein is meant along a line as in the flow of fluids through a narrow duct or passage. The flow through the mixer employed in the invention is turbulent although highly directional owing to the close proximity between the cylindrical wall of the housing and certain rotor blades as will be described more fully hereinbelow.

The general shape of the treatment zone employed in accordance with the invention is annular. By the term "annular" as used herein is meant a treatment zone which is generally ring-shaped. Thus, in a typical apparatus constructed in accordance with the invention the annular treatment zone is about 14 inches in diameter, about 3.5 inches in width and about 1/16 of an inch in thickness. The path of the particles in the treatment zone when viewed from in a direction parallel to the axis is arcuate in shape. When viewed from a direction perpendicular to the axis, the path taken by the particles appears as a substantially straight line. The treatment zone is of a determine length and encompasses an arc of less than 360°. Thus, in one machine constructed in accordance with the invention and having dimensions described above the length of the treatment zone from the point of entry of the particles to the point at which the agglomerates are exhausted into the drying atmosphere was about 12 inches. At a selected point within this arc of 12 inches, moisture was introduced into the turbulent accelerated stream of particles. The distance between the point at which the moisture was introduced and the point at which the particles were exhausted was also of determinate length and it was by this means that I have found the time interval during which solid particles were mixed with water could be accurately controlled and limited to a relatively brief period of time preferably on the order of about 1 to 20 milliseconds with 4 to 8 milliseconds being typical.

As can be seen clearly in FIGURES 3 and 7, in the acceleration zone designated A, particles enter the treatment chamber and are accelerated by the tips of the rotor blades adjacent the housing wall as they travel through the annular treatment zone. They then strike water particles entering through a nozzle C in FIGURE 3 and enter a turbulent mixing zone B in which they are maintained in random motion and are vigorously mixed with the water particles. As they make random contact with each other in zone B, the particles become bonded together at their points of contact to form highly porous agglomerates. It should be noted that while there is a degree of turbulence in the mixing zone, the path of the stream as a whole is generally linear through this zone. When the end of the turbulent mixing zone B is reached the particles are exhausted directly into a drying atmosphere which typically comprises heated air or heated inert gas.

The width of the annular mixing zone can be varied considerably depending upon the size of the mixer and the amount and type of material being handled. The width of the inlet and discharge should approximate the width of the rotor. If the width of the rotor is much greater than the inlet or discharge, there is a tendency for the particles to travel substantial distances spirally rather than annularly and the resultant axial flow variations would vary the processing time. For the same reason, it is desirable for the material introduced to the mixing zone to be uniformly distributed across the width of the zone. Thus the mixer width is limited by the capability of the feeding device to distribute the material across the width of the mixing zone.

It will be obvious that, at some sacrifice in effectiveness, a machine falling within the scope of my invention could be constructed in which the relationships between width of rotor and both width and positioning of the inlet and outlet depart somewhat from the preferred limitations described in the preceding paragraph.

The clearance between the rotor and the cylindrical walls of the mixing chamber is not considered critical but generally should be relatively small. Dimensions on the order of about $\frac{1}{32}$ to $\frac{1}{4}$ of an inch are preferred. In the event a substantially greater clearance than this is used, there will be a tendency for inadequate mixing and the flow of the gas through the chamber will be retarded by frictional drag at the wall.

The rotor speed can be varied considerably. A rotor tip speed of about 100 feet per second was found satisfactory in the case of materials upon which tests have been run. It will be understood that if the rotor is travelling at too low a speed poor gas circulation will cause deposits to form. If the speed is too high, the equipment may be damaged or there may be a tendency for the product to be burned. In general a peripheral speed from about 50 to 500 feet per second and preferably between 80 and 120 feet per second are satisfactory.

Blades such as radially oriented plates aligned parallel with the axis of rotation are preferably provided on the rotor. The blades preferably are treated so that the materials being processed do not adhere to them. They can, for example, be coated with polytetrafluoroethylene or other similar material.

Gas can be supplied to the mixing zone in part through the inlet through which the particles being agglomerated are introduced. It is, however, preferred that a substantial portion of the gas be introduced to the mixer through an axial inlet adjacent the rotor shaft, and to this end openings are preferably provided in the end walls of the mixer to serve as air inlets. The air thus flows inwardly from the center of the side walls and thence through the mixing chamber thereby preventing particles from migrating out of the annular mixing zone and is expelled together with the agglomerated product into the drying atmosphere.

The nozzle employed for injecting water or other agglomerating liquid into the mixer distributes the liquid evenly across the width of the mixing zone and can consist, for example, of a relatively narrow slit extending the full width of the annular treatment zone. The slit has the proper size to expel the liquid through the slit with sufficient velocity to prevent even partial clogging of the slit by the particles.

The length of the mixing zone can be varied considerably depending on the nature and degree of absorptiveness of the product and the speed of the gas stream passing through the mixing zone. For greater gas velocities, the length of the mixing zone should be increased and for more absorptiveness the length of the mixing zone should be decreased. It will be seen that the time of turbulent mixing will vary directly with the length of the mixing zone and inversely with the speed of the rotor. Therefore, by controlling the length of the mixing zone and rotor speed the time period of turbulent mixing of the solid and liquid phases can be reliably regulated.

As mentioned above, the agglomerated particles are expelled directly into a drying atmosphere. Drying is conveniently accomplished by suspending the agglomerated particles in a stream of heated gas such as hot air. The heated air can be supplied through a duct which preferably but not necessarily is vertical. It is important to keep agglomerated particles from being packed tightly together while the agglomerates are still tacky since this would tend to produce a relatively dense, non-porous chunk rather than the desired agglomerates of relatively small and uniform size.

Refer now to FIGURES 2–6 which illustrate by way of example a preferred form of practising the invention. As seen in FIGURE 2, a water absorbent pulverulent material such as pregelatinized starch 8 is supplied from a hopper 10 at a suitable constant rate by a feed apparatus 12 of any suitable well-known construction having an adjustable gate 14 for controlling the height of the layer 16 of pulverulent material on a conveyor belt 18 which runs at a constant speed thereby delivering a constant uniform flow of starch to the inlet 22 of a mixer in accordance with the invention.

The annular linear-stream treatment chamber and mixer will now be described in connection with FIGURES 5, 6 and 7. The mixer is composed of a casing 26 including a flanged cylindrical wall 28 and two parallel end walls 30 and 32. The cylindrical wall 28 is secured between the end walls 30 and 32 by means of bolts 34. Integral with the walls 30 and 32 are bearings 36 and 38 respectively. Journalled within the bearings 36 and 38 for rotation on the axis of the cylindrical wall 28 is a horizontally disposed rotor 40 having a shaft 42 and an impeller 44 made up of two spaced plates 44a and 44b having radially extending vanes 48 secured to their outward surfaces. Openings 49 are provided in the housing walls 30 and 32 adjacent shaft 42. The flow of air into the housing through the openings 49 is controlled by stops 51 adjustably mounted on the shaft 42. A centrally extending circumferential recess 50 is defined by the space between plates 44a and 44b.

The inlet 22 for the product to be agglomerated preferably should be in the wall 28 of the casing 26 or immediately adjacent to it. Alternatively but less preferably, the inlet 22 can be through one or both end walls 30 or 32 in which case the inlet preferably should be at or close to the periphery defined by the inner surface of wall 28 rather than at a point intermediate between the wall 28 and the shaft 42. If the material were instead introduced a substantial distance inward from the periphery of the housing, different particles would travel different distances between the inlet and the outlet. Moreover, some of the particles would travel through an arc greater than 360° which is undesirable.

The inside edges of the recess 50 are provided with radially extending aligned pairs of grooves 52 which serve as holders for receiving circumferentially spaced radially extending axially aligned blades 54. The blades 54 are held in position by means of retainer rings 56 which are themselves fastened to the impeller by means of bolts 58. The blades 54 are partially covered with polytetrafluoroethylene sheets 60.

As can be seen in FIGURE 7, the lower aspect of cylindrical wall 28 of the casing 26 consists of a plurality of arcuate removable sections 62 having lap joints 64 between adjacent sections between which is mounted an agglomerating fluid injection nozzle 68. In FIGURE 8 it will be seen that by removing the nozzle 68 from the position shown in FIGURE 7 and sliding the sections 62 either toward the right or the left, the nozzle 68 can be moved to any of various positions between the inlet 22 and a discharge outlet 82.

Refer now to FIGURES 7 and 8. The nozzle 68 comprises two generally rectangular casing members 70 and 72, one of which is provided with a central recess 74 communicating through a feed line 76 with a source of agglomerating fluid such as water. During operation, water flows through the line 76 into the recess 74 and is expelled through an outlet opening or discharge nozzle 78 formed by placing a relatively thin sheet of brass shim 80 between the casing members 70 and 72 with a portion thereof in the area between the recess 74 and the housing 26 being cut away to define the outlet 78.

As can be seen in FIGURES 7 and 8, portions of the nozzle 68 are provided with suitable recesses 79 which mate with the wall sections 62. Positioned on the inside surface of the housing wall adjacent plate 62 between the nozzle 68 and the outlet 82 is a liner 84. The liner 84 is composed of a material to which materials being processed will not adhere. One suitable material for this purpose is polytetrafluoroethylene.

The inlet 22 is tangent to the cylindrical wall of the mixer 24. On the other side of the housing wall is located the discharge duct 82 which extends outwardly and preferably tangent to the housing wall in the direction of flow of the particles from the inlet 22 to the nozzle 68. Accordingly, the rotor should turn in counterclockwise direction as seen in FIGURE 7.

During operation, the dry particulate material entering the inlet 22 is accelerated by the rotation of the impeller and the blades 54. At the nozzle 68 the particles are contacted by the agglomerating liquid fed through the nozzle 68. Between the nozzle 68 and the discharge outlet 82, the particles are carried in an annular linear-stream and are intimately mixed with the liquid in a highly turbulent stream of air. When the outlet duct 82 is reached, the particles are exhausted partially by centrifugal force and partially because of the streaming of air through the duct 82 and are carried by the duct 82 into a drying atmosphere which in this instance consists of a column of heated air rising within a relatively large diameter tube 90. Virtually none of the particles makes a complete revolution of the housing. The air in tube 90 can be at a temperature of from 70° F. to 800° F. but is preferably between about 375° F. and 405° F. The air flowing upwardly through the drying tube 90 thus defines a drying zone 92. The air passing through tube 90 is conveniently heated by means of a gas heater 94 and is driven by the provision of a suitable blower or fan 96 which communicates with the top of the duct 90 through a collector 98 used for removing the dried agglomerates from the gas stream. The agglomerates in the collector 98 are removed through a rotary discharge valve 100. Dried agglomerates are allowed to flow from the valve 100 through duct 102 to a sifter of a suitable conventional known construction 104 and from the sifter the coarse particles pass through a duct 106 to a mill 108 such as a Fitzmill to reduce the particles to the desired size. The particles pass out of the Fitzmill through a duct 110 to a second sifter 112 similar to 104 which contains stacked screens with openings of graded sizes. In this instance, the coarse particles are returned through a line 114 to the mill 108, the fines are returned through a line 116 to the feed hopper 10 and the finished product which consists of agglomerates of a desired size is conveyed through a duct 118 to a finished product storage container 120. The fines from the sifter 104 are conducted through a conduit 105 to the hopper 10 of the feeder 12. The finished product passing through the sifter 104 flows through a duct 107 to the product storage container 120. While the present invention is useful in connection with pregelatinized starch and carrageenin gum and a variety of other hydratable powdered materials such as guar gum, gum arabic, Irish moss extractives and the like, it is also useful with materials other than hydrophilic coiloids such as sodium tripolyphosphate.

The invention will be better understood by reference to the following examples.

*Example I*

Pregelatinized starch was agglomerated in accordance with the invention employing the apparatus in FIGURES 2–8. The conveyor 18 was operated to feed the pregelatinized starch into the mixer at the rate of 900 lbs. per hour. The mixer had an inside diameter of 14 inches, a width of 3.5 inches and the clearance between the rotor 40 and the housing wall was 1/16 inch. The rotor ran at 1800 r.p.m. The distance of the nozzle 68 from the discharge openings 82 was 10 inches and the resulting mixing time was calculated at 8 milliseconds. Water was used as an agglomerant and admitted through the nozzle 68 at the rate of 110 lbs. per hour. The exhaust duct 82 was about one foot in length. The drying tube 90 which was 10 inches in diameter and 75 feet high. The air in tube 90 was at a temperature of about 375° F.–405° F. at the point where the agglomerates entered. The air was fed through the duct 90 at the rate of 2200 cubic feet per minute. The finished product was found to be highly satisfactory and consisted of relatively uniform agglomerates which were highly porous and contained a multiplicity of pores and channels extending between the particles. There was no charring or formation of gummy deposits within the mixer 24 or the drying tube 90. The agglomerates when added to water could be readily moistened.

*Example II*

A gum known as water soluble calcium carrageenin extracted from red marine plants of the order Gigarlinales was agglomerated in the same manner as that described in Example I with the following differences. The rotor speed was 2400 r.p.m., the air temperature was 300° F. and the feed rate was 600 lb./hr.

The finished agglomerated water soluble calcium carrageenin gum was highly uniform in consistency. The agglomerates were highly porous and exhibited excellent dispersing properties when added to water, i.e. it was possible to rehydrate them readily. Again, no massive gummy deposits formed within the mixer 24 or other parts of the apparatus and the finished product was not contaminated with charred pieces of the gum or of other impurities.

*Example III*

Non-fat spray dried milk solids were agglomerated using an agglomerator as described above. The agglomerator was 14 inches in diameter, 4 inches wide and was run at 1800 r.p.m. Water was introduced at the rate of about 0.65 lb. per minute. The nozzle slit was .003 inch in width. The milk was introduced at the rate of 10 lbs. per minute. The drying air had a dry bulb temperature of 270° F. at the mixer. Coating of the agglomerator was slight. The agglomerates were well formed, had satisfactory strength and were highly dispersible in water. Thirty percent were between $110\mu$ and $600\mu$ in diameter. The agglomerates were particularly satisfactory from the standpoint of dispersion stability which was better than commercially available milk powders.

*Example IV*

Dried egg albumen powder was agglomerated as in Example III except that the air temperature at the agglomerator was 288° F. and water was introduced at the rate of 0.7 lb. per minute. The agglomerates had satisfactory strength and the dispersability of agglomerates raanging from $153–860\mu$ was substantially better than the unagglomerated product.

*Example V*

Gelatin was agglomerated as in Example III except that the air temperature at the agglomerator was 269° F. 0.85 lb. of water were added per minute. Agglomerates ranged ranged in size betwen $130\mu$ and $295\mu$ and had a greatly improved rate of hydration in hot water and dispersed readily in cold water compared with starting material.

*Example VI*

Anhydrous sodium tripolyphosphate particles were agglomerated as in Example III except that the air temperature at the mixer was 240° F. The product feed rate was 15 lbs. per minute. Water was added at 1.3 lbs. per minute. Agglomerates having satisfactory strength were formed. They could be dispersed easily in water.

It is apparent that a great many modifications in construction can be made. For example, the product can be withdrawn directly from the dust collector. If, on the other hand, further drying is required an additional dryer can be used. Further modifications and variations of this invention as hereinbefore set forth may be made without departing from the spirit and scope thereof. The specific embodiments are given by way of example only and the invention is limited only by the terms of the appended claims.

I claim:
1. A process for agglomerating pulverulent material of the type characterized by having a relatively rapid rate of hydration comprising:
   (a) establishing a turbulent linear-stream of gas of determinate length,
   (b) introducing and dispersing said pulverulent material into the gas stream at a selected feed point,
   (c) introducing an agglomerating fluid into the stream at a point downstream of the feed point thereby mixing the fluid and pulverulent material in the turbulent stream of gas to form porous agglomerates therein,
   (d) transferring the agglomerates directly into a drying atmosphere to dry and rigidify the agglomerates.
2. The process according to cliam 1 wherein the turbulent mixing is carried out for a period of between about 1 and 20 milliseconds.
3. The process according to claim 1 wherein the particulate material being agglomerated comprises a pulverulent material which absorbs water easily.
4. The process according to claim 1 wherein the solid pulverulent material is fed into the gas stream continuously at a constant rate and said fluid comprises a liquid fed to the gas stream at a rate directly proportional to the feed rate of the pulverulent material.

5. The process according to claim 1 wherein the solid pulverulent material comprises a carrageenin gum.

6. The process according to claim 1 wherein the pulverulent material comprises pregelatinized starch.

7. The process according to claim 1 wherein the pulverulent material comprises dried milk solids.

8. The process according to claim 1 wherein the pulverulent material comprises dried egg albumen powder.

9. The process according to claim 1 wherein the pulverulent material comprises gelatin.

10. The process according to claim 1 wherein the pulverulent material comprises anhydrous sodium tripolyphosphate.

11. An apparatus for agglomerating solid pulverulent material comprising in combination:
 (a) a housing having at least one wall,
 (b) a rotor mounted for rotation within the housing,
 (c) a linear-stream annular treatment zone of determinate length defined by the space between the wall of the housing and the periphery of the rotor, said rotor being mounted for rotation adjacent to the treatment zone for propelling the particles from one end of the zone to the other end thereof,
 (d) drive means for imparting rotation to the rotor to propel said material through the annular treatment zone,
 (e) an inlet duct communicating with the housing at a point adjacent the wall of the housing for feeding solid pulverulent material into the housing at one end of the treatment zone,
 (f) an outlet duct communicating with the other end of the treatment zone for exhausting agglomerates from the housing, said exhaust duct extending outwardly from the wall of the housing,
 (g) a drying chamber communicating with the outlet duct to receive the agglomerates propelled from the apparatus through the outlet duct and,
 (h) a nozzle between the inlet and outlet ducts for introducing an agglomerating fluid into the treatment zone at a point between the inlet and outlet and at a predetermined distance from the outlet to define a turbulent linear-stream annular mixing zone of a determinate length between the nozzle and the outlet.

12. The apparatus according to claim 11 wherein the housing is cylindrical, the inlet and outlet ducts are tangent to the periphery of the housing and said rotor is rotated in a direction adapted to propel the particulate material from the inlet to the outlet past the nozzle.

13. The apparatus according to claim 11 wherein the nozzle comprises a chamber having an elongated orifice therein extending from one side edge of the annular mixing zone to the other side edge thereof whereby fluid is adapted to be introduced through the nozzle across substantially the entire width of the treatment zone.

14. The apparatus according to the claim 11 wherein the rotor includes a plurality of peripherally mounted circumferentially spaced radially disposed and axially aligned blades.

15. The apparatus according to claim 14 wherein the blades are coated with a material to which the pulverulent material does not adhere.

16. The apparatus according to claim 15 wherein the coating material comprises polytetrafluoroethylene.

17. The apparatus according to claim 11 wherein the inside surface of the housing wall between the nozzle and said outlet is coated with a liner to which the pulverulent material does not adhere.

18. The apparatus according to claim 11 wherein the rotor comprises a body having a plurality of radially positioned blades on each surface thereof extending a portion of the way to the periphery, the outward portion of the rotor is provided with a circumferentially extending recess having a plurality of circumferentially spaced axially aligned radially disposed blades therein and each of the blades is provided with a relatively poorly adherent material on at least a portion of the surface thereof.

19. The apparatus according to claim 18 wherein rings are provided for securing the blades in position.

20. The apparatus according to claim 11 wherein the drying chamber comprises a vertically disposed duct, a blower for moving air upwardly through the duct and means for heating the air introduced to the duct prior to contact with the agglomerates fed thereto from the outlet duct.

21. The apparatus according to claim 11 wherein sifters are connected to receive the agglomerates discharged from the apparatus to classify the agglomerates according to size and a means is provided for returning the particles of an unsuitable size to the apparatus for reprocessing.

22. The apparatus according to claim 11 wherein said nozzle means includes an elongated relatively narrow outlet opening extending across the width of the housing along a line parallel to the axis of the rotor and positioned between the inlet and the outlet.

23. The apparatus according to claim 11 wherein said nozzle is adapted to be moved to selected positions on the periphery of said housing between said inlet and said outlet to vary the distance between the nozzle and the outlet for controlling the time period of exposure between the pulverulent material and agglomerating fluid.

24. The apparatus according to claim 11 wherein the said rotor comprises a shaft having a disc mounted thereon and a plurality of circumferentially spaced axially aligned rotor blades, said rotor blades being spaced between about $\frac{1}{32}$ and $\frac{1}{4}$ inch from the wall of the housing.

25. The apparatus according to claim 11 wherein the housing comprises a generally cylindrical casing having parallel flat end walls and a cylindrical side wall, the inlet duct extends substantially the full width of the housing, the inlet and outlet ducts both being tangent to the cylindrical wall and said rotor mounted within the casing having blades thereon position concentrically within the casing and a drive means for the rotor adapted to turn the rotor between about 1000 and 5000 r.p.m.

References Cited

UNITED STATES PATENTS

| | | | |
|---|---|---|---|
| 3,207,489 | 9/1965 | Berman | 259—107 |
| 3,251,695 | 5/1966 | Gidlow | 99—93 X |

ROBERT W. JENKINS, *Primary Examiner.*